United States Patent [19]

Lawrence et al.

[11] 3,814,905

[45] June 4, 1974

[54] EMBOSSED CARD READER

[75] Inventors: Willis Thompson Lawrence, Winchester; David B. Spaulding, Carlisle, both of Mass.

[73] Assignee: Amron Research and Development Corporation, Longmeadow, Mass.

[22] Filed: Aug. 22, 1972

[21] Appl. No.: 282,723

[52] U.S. Cl. 235/61.11 E, 235/61.11 C, 250/219 D

[51] Int. Cl. .......... G06k 7/10

[58] Field of Search . 235/61.7 B, 61.11 R, 61.11 C, 235/61.11 E; 250/219 D; 340/149 A, 14.3 Z, 146.3 AE; 179/2 CA, 2 DP, 90 CS

[56] References Cited

UNITED STATES PATENTS

| | | | |
|---|---|---|---|
| 3,671,717 | 6/1972 | Bieser | 235/61.7 B |
| 3,714,398 | 1/1973 | Brock | 235/61.11 E X |

*Primary Examiner*—Thomas J. Sloyan
*Attorney, Agent, or Firm*—Richard J. Birch

[57] ABSTRACT

An embossed card reader which utilizes a spring-loaded follower that modified a light beam to a photodetector when the follower encounters an embossed member on the card.

8 Claims, 6 Drawing Figures

EMBOSSED CARD READER

CROSS REFERENCE TO RELATED APPLICATION

This application is related to the application of Dominic S. Sarcia for Embossed Card Reader and Imprinter Ser. No. 282,715 filed concurrently herewith and assigned to the same assignee as the present application.

BACKGROUND OF THE INVENTION

The present invention relates to card readers in general and, more particularly, to an embossed card reader which utilizes a spring-loaded follower light beam interrupter to detect the presence of an embossment on a card.

An important requirement of the merchandising industry is the ability to verify that bank cards such as Mastercharge and BankAmericard, or in-house charge cards are valid when a person attempts to use them for a charge purchase. At the present, no units are in general use which are capable of reading the embossed letters on these credit cards. A number of methods are available or are in the process of being developed. Two of these methods require a modification of the present embossed credit card. In one method, a bar code is printed in ultraviolet ink on the back of the card. This code is read using standard optical reading techniques. In the other method, the card is magnetically encoded using either a tape applied to the back of the card or discs laminated inside the card.

Several systems have been developed which read the embossed numbers directly. One of these uses a complicated array of fingers which "feel" the grooves in the rear of the card and operate levers. These levers are read by a magnetic head pick-up which passes over them. This system is mechanically difficult to assemble and requires very good registration of the numbers on the card and a constant center-to-center distance for these numbers.

Another mechanical finger system employs spring-loaded fingers which make or break mechanical switches when the fingers are raised by the embossments on the card. This system is described in U.S. Pat. No. 3,299,298 issued Jan. 17, 1967 to T. J. Schinner for EMBOSSED CARD READING DEVICE. A similar arrangement is also shown in U. S. Pat. No. 3,359,369 issued Dec. 19, 1967 to Diloric, et al, for SYSTEMS FOR PROCESSING DATA OVER TELEPHONE NETWORKS. (See FIGS. 8–12).

The mechanically actuated switching systems are subject to a number of difficulties which make them undesirable in a variety of applications. The mechanical fingers and switches are relatively sensitive to contamination by dust and dirt and have a concommitally shorter mean — time — between — failures. Furthermore, the mechanical operation of the switch contacts can, and often does produce a "switch bounce" that affects the decoding circuitry.

Still another method for reading embossed cards optically reads the rear grooves by shining a light at an angle to the card and reading the shadows. This technique uses a scanning fiberoptic head to read the numbers. Difficulties in such a system arise from non-uniform colors on the back of different types of cards.

In addition, the system requires an electronic sophistication which makes it inherently expensive.

It is, accordingly, a general object of the present invention to provide an embossed card reader which eliminates the problems of the prior art readers.

It is a specific object of the present invention to provide an embossed card reader which utilizes a spring-loaded follower which modifies a light beam to a photodetector whenever the follower encounters an embossment on the card.

It is a feature of the present invention that the card reader eliminates mechanical switching and the attendant problems thereof.

It is still another feature of the invention that the positional tolerances are greatly reduced and the card reader can accurately read worn cards.

These objects and other objects and features of the present invention will best be understood from a detailed description of a preferred embodiment thereof, selected for purposes of illustration and shown in the accompanying drawings in which.

Figure 1:
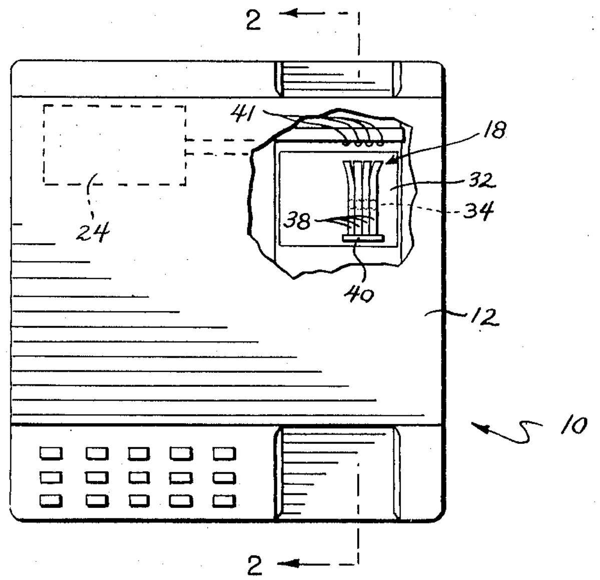
FIG. 1 is a plan view partially broken away of an embossed card reader constructed in accordance with the present invention.
Figure 2:
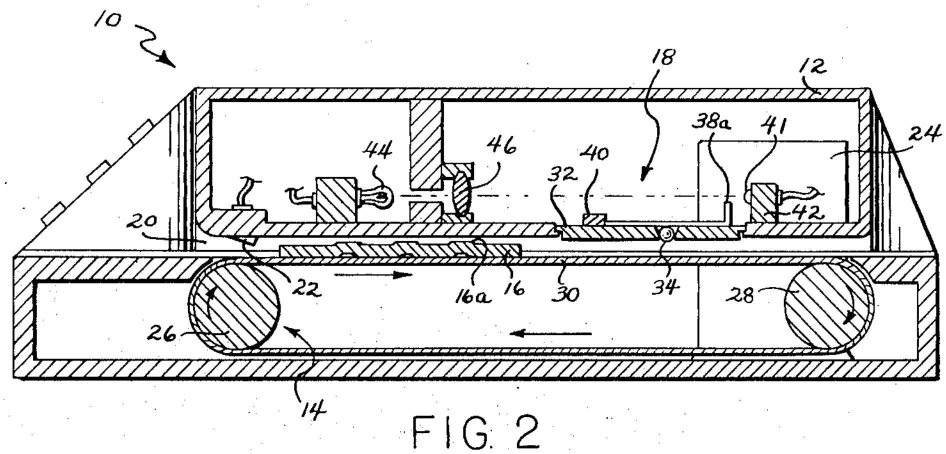
FIG. 2 is a view in cross-section taken along line 2—2 in FIG. 1.

Turning now to the drawings and looking particularly at FIGS. 1 and 2 thereof there is shown an embossed credit card reader constructed in accordance with the present invention and indicated generally by the reference numeral 10. The embossed card reader 10 has a housing 12 within which are operatively mounted a card transport system 14 which transports an embossed credit card 16 passed an embossment sensor 18.

When the embossed credit card 16 is inserted in the housing slot 20, the leading edge of the credit card closes a micro-switch 22 which applies electrical power to a transport system drive motor 24. The drive motor is mechanically coupled to at least one of the two rolls 26 and 28 of an endless belt conveyor 30.

Positioned above the transport system conveyor belt 30 is a containing plate 32 which together with the conveyor belt 30 defines a restricted horizontal path for the credit card through the card reader 10. The vertical distance, as viewed in FIG. 2, between the upper surface of the conveyor belt 30 and the lower surface of the containing plate 32 is substantially equal to the thickness of the credit card 16 including its embossment **16*a*.**

The containing plate 32 supports the various components of the card embossment sensor 18. Looking at FIGS. 2 through 4 it can be seen that a ball 34 is contained in the containing plate 32 by a tapered or shaped hole 36 therein and by a cantilevered spring 38 which is secured at one end by a fastening means 40. The distal end of the cantilevered spring 38 is turned upwardly to form a light beam interrupting portion 38*a*. A photodetector 41 is supported by mounting element 42 on one side of the upturned light beam interrupting portion 38*a*. On the other side of the cantilevered spring interrupting portion 38*a* is a light source 44. Suitable optics 46 may be provided for the light source to form a directed beam from the light source 44 to the photodetector 41. It will be appreciated that the combination of the ball 34 containing plate hole 36 and the cantilevered spring 38 form a spring-loaded, ball follower indicated generally by the reference numeral 48.

The operation of the credit card reader 10 can best be understood by referring to FIGS. 1 through 4. The credit card 16 is inserted in to the card reader through slot 20 and engages micro-switch 22, which controls the operation of the card reader motor 24. With the switch tripped, the drive system 14 is actuated and the continuous conveyor belt 30 transports the card 16 past sensor 18.

Figure 4:
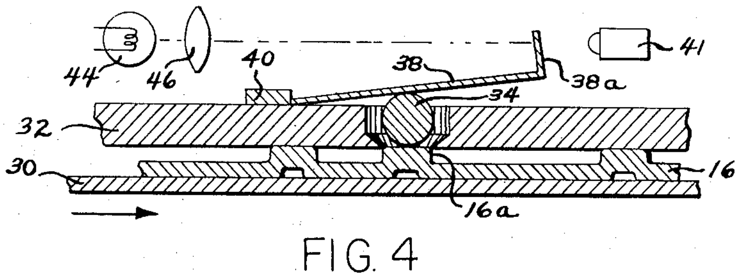
FIG. 4 is a similar view to FIG. 3 showing a spring-loaded ball bearing light beam interrupter in contact with an embossment on the card.

When the embossment 16a of the credit card engages the lower surface of ball 34, the ball is raised upwardly, as viewed in FIG. 4. The upward movement of ball 34 raises the cantilevered spring 38 to a point where the light beam interrupting portion 38a of the spring is positioned in front of the photodetector 41 thereby blocking the light from source 44 to the photodetector. The interruption of the light beam to the photodetector turns the photodetector off thereby creating an electrical signal representing the presence of an embossment 16a on the credit card.

Figure 6:
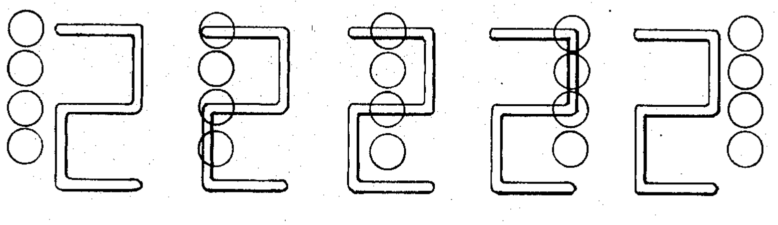

Referring to FIGS. 1 and 6, it can be seen that the four spring-loaded ball followers 48 each make or break a light beaam to a corresponding photodetector. Thus, the position of each of the light beam interrupting portions 38a of the corresponding springs indicates the presence or absence of an embossment directly below the associated spring-loaded ball follower.

Figure 3:
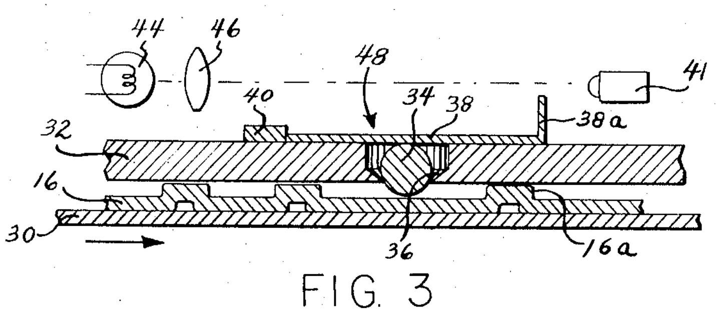
FIG. 3 is an enlarged diagrammatic view showing the operation of the spring-loaded, ball follower light beam interrupter in its rest or non-contact position.

As the embossed card 16 moves relative to the spring-loaded balls 34, as shown in the sequence of FIGS. 3 and 4, the corresponding photodetectors are turned on and off by the embossments passing beneath the spring-loaded balls. The action of light beam making and breaking produces an output pattern of electrical signal from the photodetector which is decoded by appropriate circuitry (not shown) to identify the numbers and/or letter on the credit card. Since the decoding circuitry can be readily implemented by those skilled in the art, it is not believed necessary to describe the circuitry in any detail.

In the preferred embodiment shown in the drawings, the spring 38 comprises a narrow piece of spring steel, beryllium, copper or other similar material which is attached to the containing plate 32 at one end with the other end bent vertically to form the light beam interrupting portion 38a. The balls 34 are approximately 0.040 inches in diameter for the four spring reading configuration and conventional credit card shown in FIG. 1. It will be appreciated that other means can be employed to obtain the spring-loaded follower light beam modifier sensor 48. For example, the spring 38 can be replaced by a rigid beam which is forced downwardly by a coiled spring. Furthermore, rather than utilizing balls 34 shown in the drawings, cylindrical rollers or rods or pivoted fingers can be used in the card reader.

The "spring-ball" configuration shown in the drawings can be replaced by a single piece with the ball or rod attached rigidly to the spring. Although these structural configurations are slightly more complicated than the preferred embodiment shown in the drawings, they still employ the general principle of operation in which an arm is moved by direct or indirect contact with the embossed number to modify a light beam thereby generating a signal which can be used to decode the embossed numbers.

It will be appreciated that while the preferred embodiment utilizes the interruption of light rays on contact with the embossment, the movable member e.g., spring extension 38, can contain an aperture so that in the down position as viewed in the drawings, the light to the detector is blocked, while in the up position, as shown in FIG. 4, the light passes through the hole and illuminates the detector. The corresponding modification of the decoding logic is obvious to those skilled in the art.

Figure 5:
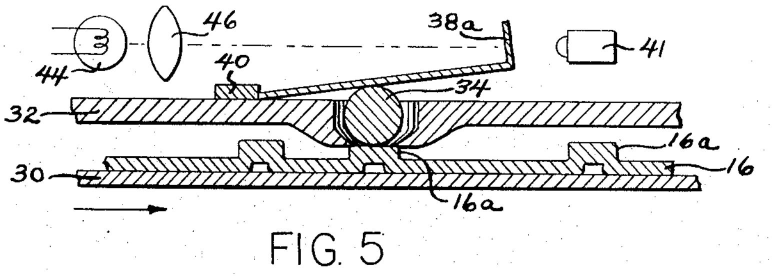
FIG. 5 is a view similar to that shown in FIG. 4 illustrating an alternative embodiment of the invention; and, FIG. 6 is a diagrammatic view of the decoding logic employed with the scanning system of the embossed card reader.

Looking now at FIG. 2, it can be seen that the containing plate 32 is free to move in a vertical direction with respect to the credit card reader housing 12 and conveyor belt 30. Given this structural relationship, the containing plate 32 will rest upon the embossed letters of the credit card. This arrangement permits the reading of various credit cards which may or may not have a uniform letter height. If the height of the letters is not uniform on a single card, the under-cut configuration shown in FIG. 5 can be employed so that the ball containing portion of plate 32 rests directly on one number despite some variations in height of other numbers on the same card. In practice, the containing plate-ball configuration shown in FIGS. 3 and 4 is perfectly acceptable for use with cards having varying letter heights on the same card since the dimensions of the card reader permit "up" and "down" motion of the ball far in excess of that which is required to actuate the sensor. It will be appreciated from inspection of FIGS. 3 through 5, that the system is designed so that over travel of the movable spring member is not detrimental in any way to the operation of the card sensor.

Having described in detail a preferred embodiment of our invention, it will be appreciated that numerous modifications can be made therein, without departing from the scope of the invention as defined in the appended claims. For instance, the spring-loaded follower has been shown engaged with the positive side of the embossments on the credit card. However, it should be understood that the negative or impression side of the embossment can be employed. In this structure, the spring-loaded ball follower drops into the depression thereby uncovering the photodetector to generate an "on" signal representing the presence of the embossment.

What we claim and desire to secure by letters Patent of the United States is:

1. A reader for an embossed card comprising:

1 a base

2 a light source mounted on said base

3 light responsive means mounted on said base and positioned to receive light from said light source, said light responsive means producing a signal having a characteristic which represents the amount of light impinging thereon; and,

4 light beam modifying means responsive to the presence and absence of an embossment on an embossed card for correspondingly modifying the amount of light from said source which impinges upon said light responsive means, said light beam modifying means comprising:

a a cantilevered, elongated member having a fixed end, a distal end which forms a light beam modifying portion movably positioned to modify the light impinging upon said light responsive means, and an intermediate section between said fixed and distal ends, said fixed end and at least a portion of said intermediate section comprising a spring, b means for fixedly securing said cantilevered elongated member fixed end with respect to said base, and c follower means spring-loaded by the spring portion of said elongated member for moving said member in response to the presence and absence of an embossment whereby said light beam modifying portion of said elongated member correspondingly modifies the amount of light impinging upon said light responsive means, said follower means being positioned with respect to said cantilevered member to provide a positive displacement mechanical advantage for the distal end light beam modifying portion thereof, whereby the displacement imparted to said light beam modifying portion by said follower means is greater than the displacement imparted to said follower means by an embossment.

2. The apparatus of claim 1 wherein said light beam modifying means in response to the movement of said follower means allows light from said light source to impinge upon said light responsive means during the absence of an embossment and prevents light from said light source from impinging upon said light responsive means during the presence of an embossment.

3. The apparatus of claim 2 wherein said spring-loaded follower means follows the positive side of the embossments on the embossed card.

4. The apparatus of claim 2 wherein said spring-loaded follower means follows the negative side of the embossments on the embossed card.

5. The apparatus of claim 1 wherein said light beam modifying means in response to the movement of said follower means allows light from said light source to impinge upon said light responsive means during the presence of an embossment and prevents light from impinging upon said light responsive means during the absence of an embossment.

6. The apparatus of claim 5 wherein said spring-loaded follower means follows the positive side of the embossments on the embossed card.

7. The apparatus of claim 5 wherein said spring-loaded follower means follows the negative side of the embossments on the embossed card.

8. The apparatus of claim 1 further characterized by the spring portion of said cantilevered, elongated member having a planar surface and planar spring damping means positioned to damp the movement of said spring portion in one direction.

* * * * *